June 30, 1953   W. J. VAN HEECKEREN ET AL   2,643,509
METHOD AND SYSTEM FOR BRAKING HOT-GAS PISTON
ENGINES AND FOR UTILIZING HEAT GENERATED
THEREBY IN OPERATION THEREOF
Filed Aug. 19, 1946   3 Sheets-Sheet 3

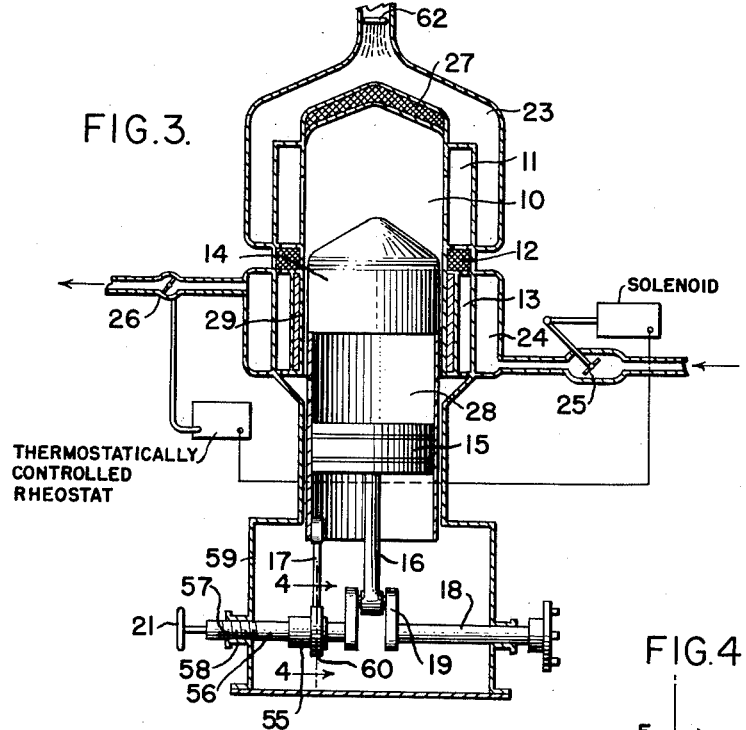
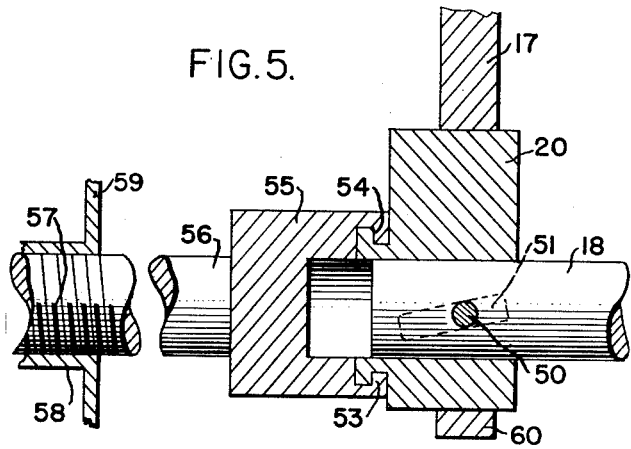
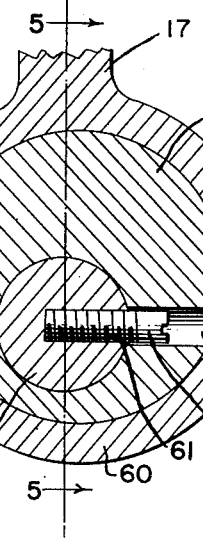

INVENTOR
Willem Jan van Heeckeren
Pieter Hajo Clay (deceased) by
J.D. Heijligers (Administrator)
BY
AGENT

Patented June 30, 1953

2,643,509

UNITED STATES PATENT OFFICE 2,643,509

METHOD AND SYSTEM FOR BRAKING HOT-GAS PISTON ENGINES AND FOR UTILIZING HEAT GENERATED THEREBY IN OPERATION THEREOF

Willem Jan van Heeckeren, Eindhoven, Netherlands, and Pieter Hajo Clay, deceased, late of Eindhoven, Netherlands, by Joris Daniel Heijligers, administrator, Eindhoven, Netherlands, assignors, by mesne assignments, to Hartford National Bank and Trust Company, Hartford, Conn., as trustee Application August 19, 1946, Serial No. 691,614
In the Netherlands June 28, 1945

Section 1, Public Law 690, August 8, 1946
Patent expires June 28, 1965

7 Claims. (Cl. 60—24)

This invention relates to a method of braking kinetic energy, which is converted for this purpose into caloric energy, and to devices for carrying out this method.

For braking a moving body it is known to convert the excess kinetic energy into heat. All mechanical brakes function in this manner, i. e. by converting the braked kinetic energy into friction heat. The heat thus produced is mostly lost for the further work process, so that with regard to efficiency such a method is preferably used only for a short time or for small powers. This method of braking involves, moreover, much mechanical wear. For higher powers and braking for a large time, for instance in the case of traction in hilly districts, the recuperative braking system may be used, but solely with electric traction. With moving bodies comprising a thermodynamic engine practically any effective possibility fails to convert the kinetic energy which is to be braked with the said engine, into heat in such a manner that wear or other troublesome additional phenomena do not occur.

According to the present invention the energy to be braked is supplied to a system comprising a hot-gas piston-engine, which engine is driven during the braking by the kinetic energy to be braked and converts this power into caloric energy with the aid of the gaseous medium circulating in the engine. The invention has, in general, the advantage that it permits kinetic energy to be converted into caloric energy without mechanical wear. In addition, the invention permits the utilization of this caloric energy.

In the present case a hot-gas piston engine is to be understood to mean an engine in which a medium of invariable chemical composition, which is permanently in the gaseous state, traverses a thermodynamic substantially reversible cycle in two chambers continuously communicating with each other and having a different temperature; in one of these chambers there occurs primarily a compression, in the other chamber primarily expansion of the medium, the machine comprising means to supplement and carry away the heat evolved and lost upon compression and expansion respectively.

The hot-gas piston engine may consist of a hot-gas engine of the closed or of the open system or of a refrigerating machine operating according to the reversed hot-gas engine principle. The two chambers having different temperatures will be referred to as the hot chamber and the cold chamber. During normal use of a hot-gas engine the expansion substantially takes place in the hot chamber, compression of the medium substantially taking place in the cold chamber. Since in a refrigerating machine operating according to the reversed hot-gas engine principle the thermodynamic cycle proceeds in exactly the opposite sequence as with a hot-gas engine, the expansion of the medium in such a refrigerating machine, during normal use, substantially takes place in the cold chamber, whereas the compression primarily takes place in the hot chamber. Consequently, with a hot-gas engine the means to carry away the heat resulting from the compression are located near the cold chamber, the means to supply heat upon expansion of the gas being located near the hot chamber. With the refrigerating machine, on the contrary, the supply of heat (cold) takes place from without but near the cold chamber, whereas the heat is drained off to the outside near the hot chamber.

In general, apart from leakage and, the other conditions remaining the same, always the same gas mass will partake in the cycle. As the case may be, part of the gas may, for instance for controlling purposes, be temporarily withdrawn from the cycle and kept in a closed tube or vessel system, to be admitted again to the cycle later on. This system is called a closed system. However, it is also imaginable particularly with hot-gas engines that the medium (air) is allowed to escape to the open air after expansion, followed by admitting a certain quantity of fresh medium from the atmosphere into the motor. This is a so-called open system; in this case cooling means are, in principle, superfluous.

In a hot-gas piston engine the cycle can, in principle, absorb energy, if it is traversed by the medium acting in the engine in such a manner that the lowest temperature it is allowed to expand, and if it is primarily compressed at the highest temperature. The energy absorbed in this case by the cycle is converted into thermal or caloric energy. In this case the required braking effect is consequently obtained by making the thermodynamic cycle in the engine proceed in a direction opposite to that in which in this engine heat would be converted into energy. The various losses in the engine, of which the mechanical friction losses are of importance, will even increase the braking power.

In one embodiment of the invention a system comprising a hot-gas engine to carry this method into effect, is characterized in that this system is suitable to supply power in two opposite directions of rotation. For braking kinetic energy the system is, in this case, adjusted in such a manner as to be suited to supply power in a direction of rotation opposite to the direction of rotation forced upon the system as a consequence of the kinetic energy to be braked. In this case the hot-gas engine associated with the system will be capable of absorbing energy, because the cycle in this engine is now traversed in a constrained manner in a direction in which this cycle absorbs energy.

It is not necessary that the aforesaid system should be provided with a hot-gas engine which itself is capable of supplying power in two directions of rotation. It is imaginable that a hot-gas engine is used which supplies power only in one direction of rotation, but that by the interposition of a change-over coupling the whole installation can supply power also in the other direction of rotation. However, use will preferably be made of a hot-gas engine whose variations of volume of the hot chamber in the two directions of rotation can lead, with a certain phase, the variation of volume of the cold chamber, in order to permit also the direction of rotation of the power supply to be reversed. With hot-gas engines having a single cylinder and a single cycle this can be ensured by changing the phase between the movements of the piston and the displacer. Hot-gas engines having more than one cycle and more than one cylinder, in which the hot and the cold chamber of one cycle are located in different cylinders with phase-displaced piston movements, can fulfill this condition if the communications between the hot and the cold chambers are so constructed as to be mutually reversible. Furthermore, by changing the phase between the piston and the displacer associated with one cycle, the degree of braking is adjustable.

In another example of the method according to the invention the braking effect is, as has already been said, ensured by supplying the power to be braked to a refrigerating machine operating according to the reversed hot-gas engine principle. This embodiment may, for example, be used in railway carriages comprising an air-conditioning system, for instance for cooling the air sucked in, in refrigerating boxes in such carriages, in refrigerating systems arranged in the proximity of the driving system of mountain railways and so on. Also in this case a variation of the phase angle between the piston and the displacer associated with one cycle permits control of the degree of braking and consequently the production of cold.

According to a further embodiment of the invention the thermodynamic cycle is deformed in such a manner, by providing a flow resistance in the stream of gas between the hot and the cold chambers of a cycle, that the cyclic process absorbs energy. This method may be used both when the hot-gas piston-engine is a hot-gas motor and in the case when the machine is designed as a refrigerating machine. This method of braking may be used in combination with one of the braking methods previously described, for example with that in which the system comprising a hot-gas engine or the hot-gas motor itself, in order to brake kinetic energy, is adjusted when the braking takes place so that a direction of rotation normal for the motor operation is which is opposite to the direction of rotation forced upon the system or the hot-gas engine as a consequence of the kinetic energy to be braked.

If a resistance of flow having a definite minimum value is included in the circuit of flow of the gaseous medium of a hot-gas engine, if the cycle proceeds in the direction in which the engine supplies energy, the crank positions in which the highest and the lowest pressures respectively occur in the cylinder will be shifted in such a manner that the gas is partly compressed in the hot state and expanded in a cooled state. Though the cycle is still being traversed in a direction in which energy could be generated, energy will be required to traverse this cycle owing to the relative shift of the parts of the cycle. This energy is partly converted into heat due to the movement of the gas through the flow resistance, which heat primarily entails an increase in temperature of the circulating medium, and is partly used to transport heat from the cooled to the heated space.

The system comprising a hot-gas engine to carry out this method need only be suitable to supply energy in the same direction in which the braking has to take place, because the cycle may proceed in the same direction. In those cases in which the supply of energy need only take place in one direction of rotation, use may consequently be made of a system which, on the whole, is only suitable for one direction of rotation.

If a refrigerating machine operating according to the reversed hot-gas engine principle comprises a flow resistance, whose passage is controllable in a suitable manner, in the circuit of flow of the medium, the consequence of the presence of such a resistance will be that the kinetic energy required to drive the refrigerating machine is higher than in the absence of this resistance.

Hot-gas engines having more than one cylinder and more than one cycle, in which the hot and the cold chambers of one cycle are distributed among two cylinders having phase-displaced piston movements, may be provided, to permit the use of this embodiment of the invention, with flow resistances that are preferably controllable and provided in the junction ducts between the cylinders.

In the case of a hot-gas engine with which the braking takes place by causing the thermodynamic cycle in the engine to proceed in a direction opposite to that in which heat is converted into energy, a heat transport to the hot chamber and heater will take place upon braking. According to one embodiment of the invention it is advisable in the case of such an engine to construct the heater so as to permit it to accumulate the heat resulting from the braking. The accumulated heat can be utilized again during the generation of mechanical energy subsequent to the braking with the engine. In order to enable this heater to accumulate a very large quantity of heat it is advisable, according to another embodiment of the invention, that the material of the heater should thermally contact with a substance which melts at a temperature exceeding the normal operating temperature of the engine. This has the advantage that a part of the heat to be accumulated may be used to melt this substance and to raise its temperature; when the engine has to supply energy again. The heat of solidification of this material may be utilised again.

As has previously been said, the degree of braking of the hot-gas piston-engine according to the invention is variable by varying the phase angle between the movements of the piston and displacer pertaining to one cycle. If a hot-gas piston engine is constructed in such a manner that several cycles take place therein and, these cycles show a certain phase displacement, such as is customary in this case, such a hot-gas piston-engine also permits, according to another embodiment of the invention, a braking effect to be ensured by varying the communications between the hot and cold chambers pertaining to different cycles.

In order that the invention may be clearly understood and readily carried into effect, it will now be explained more fully with reference to the accompanying drawings, given by way of example.

Fig. 3 represents a hot-gas engine which is particularly suitable for using the invention.

Figure 4 is a cross section of the phase varying device along section line 4—4 in Figure 3.

Figure 5 is a longitudinal cross-section of the same phase varying device along section line 5—5 in Figure 4.

Figure 1:
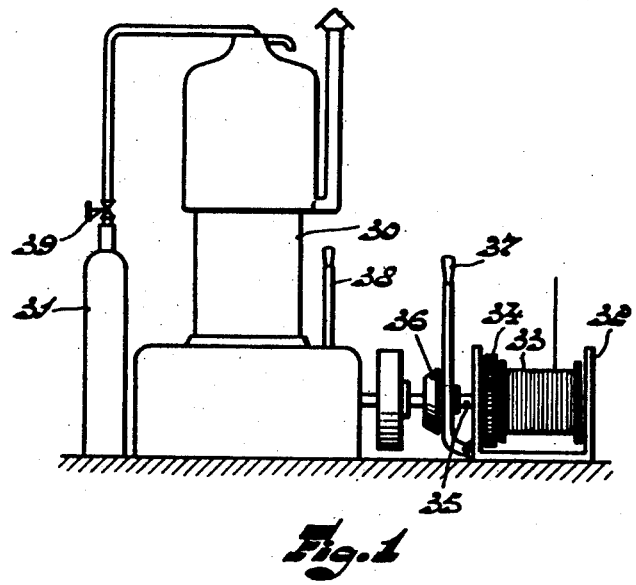
Fig. 1 represents a hauling winch with a hot-gas engine as a driving means.

In Fig. 1 the reference numeral 30 designates a hot-gas engine of the usual construction which is suitable for the supply of power in one definite direction of rotation only. Beside the engine is arranged a fuel vessel 31 out of which the fuel is fed under pressure to the burner which is integral with the engine. A cock 39 in the fuel pipe permits the fuel supply to be stopped completely when the engine is put out of action. The driving force of this hot-gas engine is transmitted, through the interposition of a friction coupling 36, to the driving shaft 35 of the hauling winch 32. The said friction coupling 36 enables the coupling or uncoupling of the hot-gas engine with the hauling winch. Variations of speed or a reversal of the movement is not allowed by this coupling. The hauling winch 32 is of a construction known per se and consists of a cable drum 33 which is secured to a gear wheel 34 having a large diameter. This gear wheel meshes with a pinion keyed to the driving shaft 35.

The hot-gas engine 30 is constructed in such a manner that the sole direction in which power can be supplied is the direction of rotation by which the cable is wound on the cable drum 33. By means of a lever 37 the friction coupling 36 can be operated, so that the winch can come to a standstill while the engine is running. The hot-gas engine is provided with a lever 38 for power control in order to adapt the energy produced by the engine to the weight of the loads to be hauled and to the speed at which these loads have to be moved. If a large number of equal loads have to be hauled, the lever may previously be given a definite position. An automatically operating regulator is housed in the crank shaft casing of the engine; it prevents racing of the engine when the load is removed. As an alternative the energy given off can be controlled, instead of by means of this regulating lever 38, by the position of the fuel supply cock 39, i. e. by the external heat supply. In such simple systems more accurate control means are omissible, if the heater parts of the engine are capable of resisting a comparatively heavy overload both in regard to temperature and to pressure. This will hold for most cases. In fact, small and simple systems are practically always overproportioned.

Lowering of the load may either occur by opening the coupling 36, so that the load can freely move, or by reducing the maximum power of the hot-gas engine to such an extent that the shaft couple occurring is lower than the couple exerted by the load on the cable drum. In the latter case the load will drive the hot-gas engine, the cycle in the engine then being compelled to take place in a reversed order as compared with the normal supply of energy and the hot-gas engine brakes the downward movement of the load. It is obvious that in this case heat is transported from the cooler (which in the present case is supposed to be a simple air cooler) to the heater. Supposing that with such simple systems the fuel supply continues to operate normally, the temperature of the heater will rise immediately. The heat thus accumulated can, however, be utilised for the supply of energy during the subsequent hauling of the next load, so that this braking method is very economical.

Figure 2:
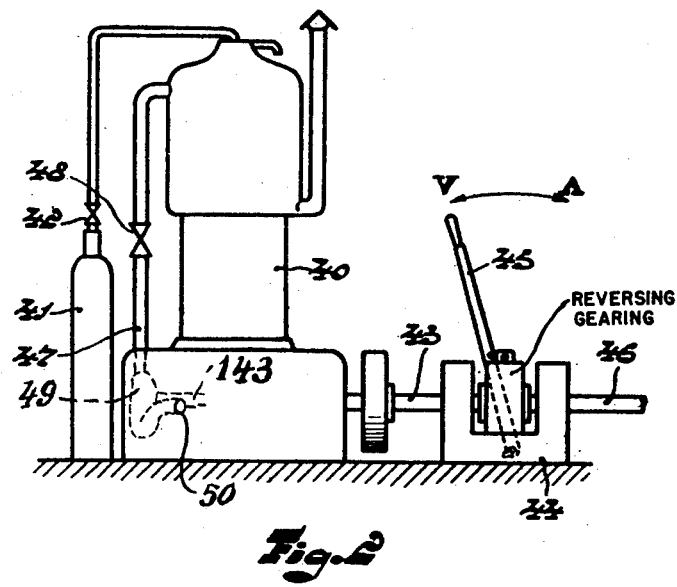
Fig. 2 shows a hot-gas engine which has to produce driving power in two different directions through the intermediary of a turning gear.

Fig. 2 represents a system for the supply of energy in two directions of rotation; in this system the braking can likewise take place in two directions of rotation. However, the hot-gas engine 40 itself is suitable only for the supply of energy in one definite direction of rotation and consequently also for braking in the opposite direction only. The hot-gas engine and the mass to be driven, which may be a vehicle or a vessel, have arranged in between them a turning gear device 44 which comprises a reversing gearing mechanism for reversing the direction of rotation of the shaft driven.

Beside the hot-gas engine is arranged a separate fuel vessel 41, out of which the fuel is supplied to the burner (not shown) of the hot-gas engine 40 through a control cock 42. This cock 42 is controlled either automatically or manually in such a manner that the heat evolved from the quantity of fuel supplied corresponds with the heat required for the supply of the wanted energy. Such a control of the indicated power is sufficient for the present purpose. However, the control device must be constructed in such a manner that the cock 42 is closed or practically closed when the power must be braked. With an engine having only one direction of rotation for the supply of energy this can, from a constructional point of view, readily be realized by means of a regulator coupled with the crank shaft.

The crank shaft 143 of the hot-gas engine is coupled with the transport shaft 43 which transmits the energy supplied to the aforesaid turning gear device 44. Such turning gears are frequently used in practice and may be supposed to be generally known so that they need not be further described in detail. The lever 45 serves for changing the direction of rotation. This lever has two positions of rest which may be marked "Forward" and "Backward." The shaft 46 serves for the coupling of the turning gear device 44 with the driving members, such as the wheels or the propeller.

If the engine supplies energy and the vehicle or vessel is driven in a definite direction, for example forwards, the braking of this movement can take place by shifting the lever 45 to the position A. The crank shaft of the engine is then compelled to rotate in an opposite direction, the fuel supply cock 42 is closed, as has been set out previously, and the heat available in the cooler of the engine is led to the heater through the thermodynamic cycle proceeding in a direction opposite to that of the supply of energy. Though practically no heat is supplied any longer to this heater, because the fuel pipe is closed, its temperature may increase materially in the case of prolonged braking. To prevent this the crank shaft 143 of the engine has fitted on it, in the crank shaft casing, a blower fan 49 (shown in dotted lines in Fig. 2) which blows cold air along the heater by means of the pipe 47 and the stop-cock 48. The blower 49 has an inlet opening 50 in the wall of the crank shaft casing. An undue rise of temperature of the heater parts is thus avoided, though on the other hand the heat evolved on braking is lost in this case. The stop-cock 48 may serve to close the fan pipe during the supply of energy and to limit the supply of cooling air during braking to the quantity required.

Fig. 3 shows a hot-gas engine which is, inter alia, capable of accumulating the heat liberated upon braking in the heater, so that this heat is no longer lost for the cycle of work. The reference numeral 10 designates the cylinder liner of this engine. In this cylinder are movable the displacer 14 and the piston both of which are driven from a common crank shaft 18. For driving the piston this crank shaft is provided with a crank 19 with which the driving rod 16 is coupled. The displacer 14 is provided with a cylindrical shell in which the piston 15 is movable to and fro. This shell is secured, by means of an eccentric rod 17 to the eccentric 20 secured to the crank shaft. This eccentric is not rigidly fastened to the shaft, but is supported by a so-called Dutch sliding bushing which is shown in detail in Figures 4 and 5 and which will now be described with reference thereto.

An eccentric 20 is mounted on the crank shaft 18 and is coupled thereto by a pin 50 for rotation therewith. Pin 50 is fixedly mounted in shaft 18 as by screw-threads 61 and rides in a slot 51 in eccentric 20. Slot 51 is at an angle to the main axis of the eccentric 20 and shaft 18. Thus, lateral displacement of eccentric 20 along shaft 18 results in a predetermined rotary shift of eccentric 20 around shaft 18 to vary the phase displacement between the eccentric 20 and the crank 19 and the corresponding rods 17 and 16.

To permit adjustment of the phase displacement a handwheel 21 is utilized to turn a shaft 56 having threads 57 mounted in bushing 58 which extends from crank casing 59. Bushing 58 has internal threads for cooperation with threads 57 whereby a lateral displacement of shaft 56 may be obtained by turning handwheel 21. Fixedly attached to shaft 56 is shank portion 55 which by cooperation of an annular inturned flange 53 thereon and an annular groove 54 in eccentric 20 causes eccentric 20 to move laterally therewith but permits eccentric 20 to rotate independently thereof.

The Dutch sliding bushing allows of varying the phase between the movements of the piston and the displacer through a range comprised between the maximum lead of the displacer with respect to the piston movement and a lagging of the same value. This permits the direction and the value of the power supply of the engine to be varied, so that the motor power between "full speed ahead" and "full speed astern" is variable.

The cylinder 10 of the hot-gas engine furthermore comprises a heater 11 concentrically arranged with respect to this cylinder, a regenerator 12 and a cooler 13. The heater 11 receives its heat from a burner 62, whose flue gases contact with the outer wall of this heater through one or more ducts 23. The cooler is surrounded by a water jacket 24 through which a stream of cooling water or cooling air can be led. When this engine supplies energy the heat of the source of heat is transmitted to the gases through the intermediary of the heater 11. The heat left in the gas after expansion and after passing through the regenerator 12 is absorbed by the cooling medium via the cooler 13. In this case the thermal cyclic process in the engine is as follows: compression of the gas in the cylinder 10, heating in the heater 11, followed by the expansion stroke of the piston 15; the expanding gas flows through the regenerator 12 wherein it gives off a great part of the heat available in the gas. The expanded gas is deprived in the cooler 13 of the remaining heat and then flows into the cylinder space 28, now on the other side of the displacer 14. The compression stroke takes place upon a further movement of the piston and the displacer; the gas flows back to the space 10 and absorbs again the heat accumulated in the regenerator 12. This is followed by heating again, and so on. If an external movement should be braked while the initial direction of rotation is maintained, the phase of the displacer movement is shifted in such a manner with respect to the piston movement that the thermal cyclic process proceeds as follows: heating in the heater 11, compression in the cylinder 10, partial heat abstraction in the regenerator 12, cooling in the cooler 13 and expansion in the cylinder 28. In this cycle the heated gas is consequently compressed, so that the temperature of this gas increases further and the heat of the gas is transferred to the heater 11 and to the parts of the motor being in contact with this heater. These parts may consequently be subjected to an increase in temperature on braking. This increase in temperature depends, per time unit, upon the value of the braked power and, in addition, upon the heat capacity of these engine parts. This heat capacity can artificially be raised by providing in the head of the engine cylinder a substance 27 whose melting point exactly exceeds the normal operating temperature of the engine. During normal operation this substance will be in the solid state in the head. Upon braking, with the consequent increase in temperature of these parts, the heat released during braking is used to melt this substance. The heat of melting of this substance thus raises the heat capacity of the engine parts on the hot side. The heat thus accumulated may be utilised during the supply of energy which may follow the braking operation, to supply heat to the gas circulating in the engine by means of the heater. In this way the heat collected during the braking operation is not lost, but is utilised for the subsequent cycle of work.

The heat transferred to the heater during the braking is withdrawn from the cooler 13 and from the engine parts contacting therewith. This cooling entails a decrease in temperature of these parts, so that in the formula for the theoretical ideal efficiency $$=\frac{T_1-T_2}{T_1}$$

the temperature $T_2$ drops, so that at the end of the braking period and at the beginning of the next supply of energy the output of the engine is increased. It is consequently of importance to allow this temperature to drop, at least as long as the cooling medium used, air or water, and the lubricant used in the engine do not render a further decrease undesirable.

When using air to constitute the cooling medium and when making use of a lubricating oil which is thinly liquid even at a low temperature, this decrease in temperature can artificially be promoted by reducing the quantity of cooling medium during the braking. For this purpose, in the form of construction shown, a regulating valve 25 is included in the supply pipe for the cooling air. This valve is controlled by a solenoid which is operated by a thermostatically controlled rheostat in turn controlled by a thermostat, whose temperature-sensitive part 26 is provided in the outlet pipe of the cooling air exactly behind the cooler of the engine. As soon as the braking operation starts, heat will be derived from the cooling air circulating about the cooler 13, so that the temperature of the temperature-sensitive element 26 drops. The regulating valve 25 is then further closed by the said thermostat, so that the quantity of cooling air is reduced per unit of time and the temperature can still further decrease. If the braking is followed again by a period of energy supply the temperature of the cooling medium increases, because the cooler 13 absorbs again heat from the gas in the engine; the regulating valve 25 opens, so that the supply of cooling air is increased again.

If cooling water is used instead of cooling air, it is often undesirable to cause the temperature to drop below freezing point because this entails obstruction of the cooling pipes. In this case it is even advisable to raise the supply of cooling water during the braking to prevent an undue temperature drop. For this purpose the same regulating mechanism may be used, but in this case the thermostat should be adjusted in such a manner that the regulating valve 25 opens with a decrease in temperature at the temperature-sensitive element 26. It is obvious that in this case the valve 25 must be constructed in such a manner that a complete obturation of the supply pipe is impossible.

Avoiding an undue temperature drop, associated with the abstraction of a considerable quantity of heat from the cooler 13 is possible by the use of a separate quantity of solidifying intermediate substance 29 which is in intimate thermal contact with the cooler. The point of congealing or solidifying of this intermediate substance should be exactly below the normal temperature of the cooling water used. During the braking the temperature will initially drop a little until the substance 29 condenses or congeals. A further cooling of the cooler takes place by the abstraction of condensation heat or congelation heat from this substance without decrease in temperature.

Figure 6:
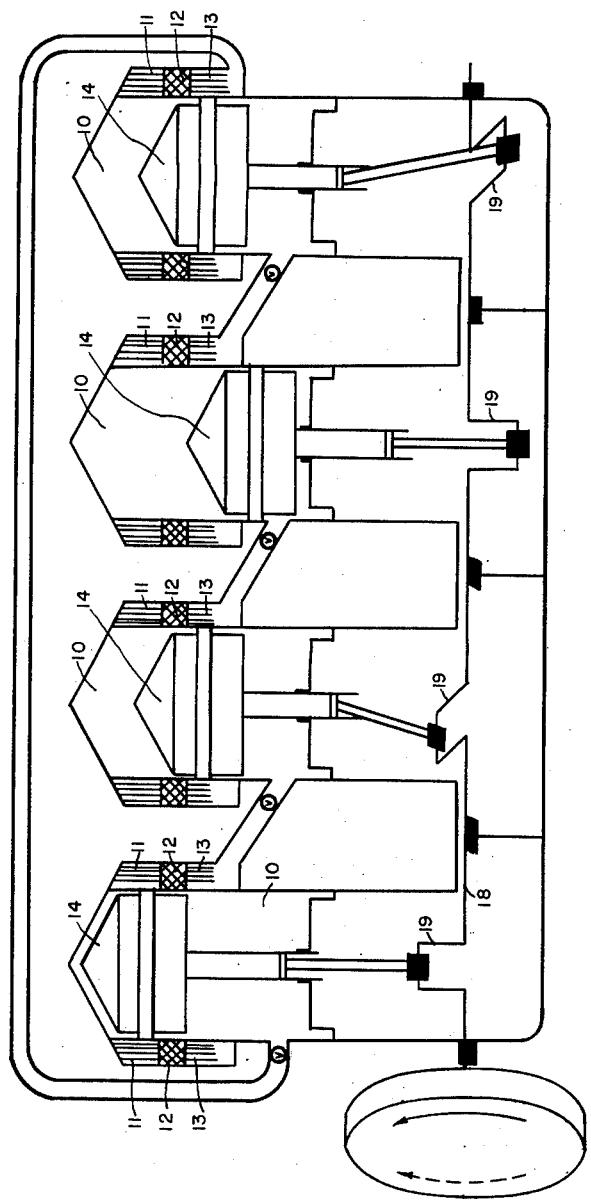
Fig. 6 is a diagrammatic view of a four-cycle engine embodying the invention.

Fig. 6 shows a four-cycle engine having valves which operate in the passageways between cylinders in such a manner that a varying resistance of the gas flowing through these passageways is obtained. A structure similar to that illustrated in Fig. 6 is shown in the patent to Van Weenen, No. 2,480,525, however there is no provision therein for the regulation of the quantity of gas flow.

What is claimed is:

1. A method of operating a hot-gas piston engine system that functions in a predetermined cyclic process during which heat is converted into energy comprising the steps of supplying heat to the hot-gas piston engine system, converting a substantial amount of said heat supplied to said hot-gas piston engine system into kinetic energy, braking said kinetic energy by causing said cyclic process to proceed in a direction opposite to said predetermined cyclic process, and introducing the heat thus formed into said hot-gas piston engine.

2. A power system comprising a hot-gas piston engine having heater means for converting the kinetic energy produced by said hot-gas piston engine into torque, means for optionally utilizing said torque in either of two directions, blower means operated by said torque, means for conducting air from said blower means past said heater means for cooling said heater means, and a valve in said conducting means, for controlling the flow of air therethrough.

3. A method of operating a hot-gas piston engine system which has a hot chamber and a cold chamber in gas flow communication therewith and which function in a predetermined cyclic process during which heat is converted into energy, comprising the steps of supplying heat to the hot-gas piston engine system, converting a substantial amount of said heat supplied to said hot-gas piston engine system into kinetic energy, and braking said system by varying the resistance to the hot-gas flow between the hot chamber and the cold chamber.

4. A hot-gas piston engine comprising a hot chamber, heater means therefor, a cold chamber, gas flow communicating means between said hot chamber and said cold chamber, and means in said gas flow communicating means for varying the resistance to gas flow therethrough.

5. A hot-gas piston engine comprising a hot chamber, heater means therefor, a cold chamber, cooler means therefor, gas flow communicating means between said hot chamber and said cold chamber, means for braking said engine, and heat storage means adjacent said hot chamber for storing excess heat formed during a braking operation.

6. A hot-gas piston engine system comprising a plurality of cylinders each housing a hot chamber of one power unit and a cold chamber of another power unit, gas flow communicating means between the hot chamber and the cold chamber of each of said power units, and means in each of said gas flow communicating means for varying the resistance to gas flow therethrough.

7. A hot-gas piston engine comprising a hot chamber, heater means therefor, a cold chamber, cooler means therefor, gas flow communicating means between said hot chamber and said cold chamber, means for braking said engine, and heat storage means adjacent said hot chamber for storing excess heat during a braking operation, said heat storage means comprising a substance which melts at a temperature exceeding the normal operating temperature of the engine.

WILLEM JAN VAN HEECKEREN.
JORIS DANIEL HEIJLIGERS,
*Administrator of the estate of Pieter Hajo Clay, deceased.*

References Cited in the file of this patent

UNITED STATES PATENTS

| Number | Name | Date |
|---|---|---|
| 537,517 | Anderson | Apr. 16, 1895 |
| 1,436,078 | Bell | Nov. 21, 1922 |
| 1,523,199 | Hofmann | Jan. 13, 1925 |
| 2,079,579 | Shrode | May 4, 1937 |
| 2,254,917 | Schroder | Sept. 2, 1941 |
| 2,277,998 | Thompson | Mar. 31, 1942 |
| 2,428,561 | Fitzgerald | Oct. 7, 1947 |
| 2,465,139 | van Weenen et al. | Mar. 22, 1949 |

FOREIGN PATENTS

| Number | Country | Date |
|---|---|---|
| 2,225 | Great Britain | Sept. 12, 1864 |